United States Patent Office 3,281,436
Patented Oct. 25, 1966

3,281,436
PROCESS FOR MAKING GEM-DIFLUORO-
STEROIDS
John S. Tadanier, Chicago, and John Wayne Cole, Deerfield, Ill., assignors to Abbott Laboratories, Chicago, Ill., a corporation of Illinois
No Drawing. Filed Aug. 5, 1964, Ser. No. 387,809
9 Claims. (Cl. 260—397)

The present application is a continuation-in-part of U.S. Serial No. 60,558, filed October 5, 1960, now U.S. Patent 3,163,661, by J. S. Tadanier and J. W. Cole.

The present invention relates to the manufacture of certain new steroids. More particularly, it is concerned with the preparation of fluorinated androstanes and pregnanes corresponding to the formula

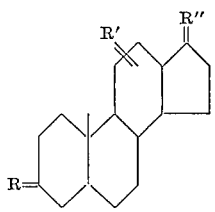

wherein

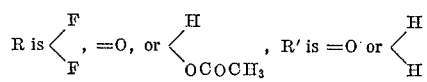

and

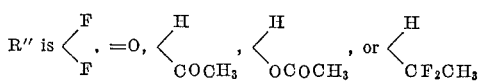

with the further provision that the compound contains at least one carbon atom with the gem-difluoro structure. The above compounds will hereinafter be simply referred to as gem-difluorosteroids of the androstane or pregnane-series, although the C-ring may optionally contain an oxo-group in the 11- or 12-position and the 5-position may alternately carry an α- or β-hydrogen or a double bond connecting to the 4- or the 6-positions.

The gem-difluorosteroids made by the present process are useful for their hormonal activity: those being unsubstituted in the C-ring are androgens with secondary effects in influencing hormone metabolism, those carrying an oxo-group in the C-ring are valuable androgen-antiandrogens, an activity described in more detail by Dorfman and Dorfman in Acta Endocrinologica, volume 33, page 308 (1960).

The new compounds defined above are made according to the present invention by reacting a steroid starting material of the formula

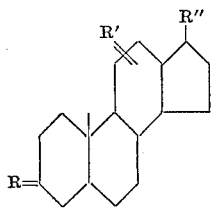

wherein

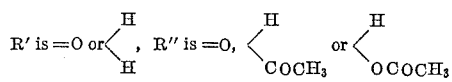

and the A/B rings have a partial structure of

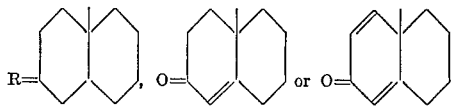

with

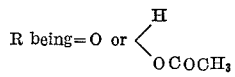

and whereby the steroid starting material carries a reactive oxo-group in at least one of the positions 3, 17 or 20, with sulfur tetrafluoride in an inert solvent and in the presence of a catalytic amount of hydrogen fluoride or boron trifluoride. The reference to a "reactive oxo-group" is used above and hereinafter to distinguish from those oxo-groups which due to their location in the molecule have no practical affinity for the replacement reaction, e.g. oxo-groups in the C-ring and those being in conjugation with a C=C double bond are non-reactive. The catalyst, as such, may be added directly to the reaction mixture; however, when hydrogen fluoride is the chosen catalyst it may be formed in situ by adding a trace of a hydroxy compound, e.g. water, methanol, isopropanol, phenol, etc., which by reaction with sulfur tetrafluoride produces the required catalytic amount of hydrogen fluoride. Among the useful solvents for carrying out the novel process are chloroform, ethyl ether, carbon tetrachloride, methylene chloride, benzene, hexane, and other saturated or aromatic liquids free of hydroxy- and keto-groups. The term "inert" signifies that the solvent does not react with any component in the reaction mixture. The desired reaction takes place slowly at low temperatures, and rapidly at more elevated temperatures. We have found that 0° to 60° C. is a suitable temperature for the formation of the new gem-difluorosteroids; the preferred temperature range for the above-described reaction is between about 5° C. and about 25° C.

It is of particular interest to note here that the reactive oxo-groups of the starting material in positions 3, 17, or 20 are readily converted to the gem-difluoro group by the process of the present invention, while an optional oxo-group in the C-ring or a conjugated ketone remains unaffected by the above process conditions.

In a general embodiment of the present process the above defined steroid is dissolved in chloroform and kept at room temperature in a closed container with at least one molar equivalent of sulfur tetrafluoride and a catalytic amount of hydrogen fluoride for several hours. The excess sulfur tetrafluoride is then removed by evaporation and the product is worked up by dissolving it in chloroform, washing said solution with water, and chromatographing the dried, concentrated solution in a manner customary in the steroid art. When the starting material contains more than one reactive oxo-group, the chromatogram will give difluoro and tetrafluoro steroids, particularly if the above fluorination reaction is not extended over an extensive period and is carried out under mild conditions. In saturated starting materials, the 3-position appears to be the favored reaction site so that for example, 3,3-difluoro-5α-androstan-17-one and 3,3,17,17-tetrafluoro-5α-androstane are obtained simultaneously.

To better understand the process of the present invention and its wide applicability, reference is made to the following examples which are meant to be illustrations only and which do not constitute the only embodiments of the present invention.

*Example 1.—3,3,17,17-tetrafluoro-5-androstane*

A solution of 2.06 g. of 5α-androstane-3,17-dione in 20 ml. of chloroform containing 3% ethanol is heated at 40° C. in a stainless steel pressure cylinder with 10.6 g. of sulfur tetrafluoride for 15 hours. The gaseous products are removed and the residue is washed into a 500-ml. separatory funnel with five 50-ml. portions of chloroform. The resulting chloroform solution is washed with two 100-ml. portions of water, 100 ml. of 5% sodium bicarbonate solution, and finally with two 100-ml. portions of water. The chloroform solution, after drying over anhydrous magnesium sulfate, is concentrated under partial vacuum on a steam bath, leaving 2.51 g. of a dark brown tar. This material is heated with 60 ml. of boiling ethanol and is subsequently treated with carbon and filtered through Celite. The carbon/Celite filter cake is washed with 100 ml. of boiling ethanol and the washings combined with the previous ethanol solution. The solution is stripped of solvent under partial vacuum on a steam bath, leaving 1.38 g. of a deep-red oil which crystallizes on standing. This material is chromatographed using first a column of 48.0 g. of alumina and benzene/hexane (1:10) for elution, and then a column of 80.0 g. of silica. Eluting the silica column with chloroform/hexane (1:5) yields 254 mg. of white crystals, which are recrystallized from ethanol/water to yield 218 mg. of 3,3,17,17-tetrafluoro-5α-androstane of melting point 84–5° C. The infrared absorption spectrum is in good agreement with the expected pattern for this structure. The analytical values indicate the empirical formula $C_{19}H_{28}F_4$.

By replacing the above starting material with the corresponding 5β-compound, 3,3,17,17-tetrafluoro-5β-androstane is obtained.

*Example 2.—3,3-difluoro-5α-androstan-17-one*

The silica column used in the chromatography of Example 1 is further eluted with chloroform to produce 1.0 g. of crystals which are recrystallized from ethanol/water to yield 823 mg. of 3,3-difluoro-5α-androstan-17-one white crystals with a melting point of 123–4° C. The found analytical values of 73.67% C, 9.07% H, and 12.18% F are in correspondence with the values calculated for the compound of the empirical formula $C_{19}H_{28}F_2O$.

*Example 3.—3,3,20,20-tetrafluoro-5α-pregnane*

The process of Example 1 is repeated but by substituting 2.0 g. of 5α-pregnane-3,20-dione for the dioxosteroid of Example 1. By following the outlined procedure, 1.48 g. of dark-orange crystals are obtained after stripping off the solvent. Upon chromatography on 50.0 g. of alumina and elution with benzene/hexane (1:10), a yield of 1.3 g. of an orange crystalline solid melting at 130–6° C. is obtained. This material is chromatographed on 80.0 g. of silica gel which by elution with chloroform/hexane (1:5) yields 120 mg. of a white crystalline solid. Recrystallization of this material from ethanol/water produces 102 mg. of 3,3,20,20-tetrafluoro-5α-pregnane melting at 120–1° C. This compound analyzes 69.80% C and 8.67% H, corresponding to the calculated values for the empirical formula $C_{21}H_{32}F_4$.

*Example 4.—3,3,20,20-tetrafluoro-5β-pregnane*

Heating 2.0 g. of 5β-pregnane-3,20-dione in 20 ml. of chloroform containing 3% ethanol with 10.6 g. of sulfur tetrafluoride at 40° C. for 15 hours in the manner described in Example 1 gives 2.62 g. of a black tar. This material is heated with 50 ml. of boiling ethanol and the mixture is treated with carbon and worked up as described above, to produce 1.96 g. of a black, partially crystalline product. This material is chromatographed on 50.0 g. of alumina by elution with benzene/hexane (1:10), yielding 1.8 g. of an orange oil. The latter is then chromatographed on 80.0 g. of silica gel. Elution with chloroform/hexane (1:5) yields 166 mg. of a white, crystalline solid which shows no absorption maximum in the infrared between 1500 and 2700 cm.$^{-1}$. Two recrystallizations from ethanol/water yield 101 mg. of 3,3,20,20-tetrafluoro-5β-pregnane melting at 104.5–106.5° C. The analytical values for this compound are found to be 70.13% C, 9.20% H, and 21.27% F, corresponding to the empirical formula $C_{21}H_{32}F_4$.

*Example 5.—17,17-difluoroandrost-4-en-3-one*

A mixture of 2.1 g. of androst-4-ene-3,17-dione, 8.0 g. of sulfur tetrafluoride, 0.4 g. of boron trifluoride, and 20.0 ml. of ethanol-free chloroform is heated 10 hours in a pressure tube at 40° C. The reaction mixture is allowed to cool to room temperature and the gaseous products are stripped. The residue is washed into a 500-ml. separatory funnel with six 50-ml. portions of chloroform. The black resin which adheres to the walls of the reaction vessel is discarded. The chloroform solution is twice washed with 100-ml. portions of water, and subsequently with 100 ml. of 5% sodium bicarbonate, and finally with two 100-ml. portions of water. The chloroform solution is dried over anhydrous magnesium sulfate and the chloroform is stripped under partial vacuum on a steam bath to leave 1.15 g. of a black, crystalline residue. This material is heated with 80.0 ml. of boiling ethanol, decolorized with carbon, and filtered through Celite. The carbon/Celite mat is washed with three 25-ml. portions of boiling ethanol and the washings are added to the original ethanol filtrate. The ethanol is stripped under partial vacuum on the steam bath, leaving 0.611 g. of a brown oil which readily crystallizes upon cooling. This material is chromatographed on 70.0 g. of alumina and eluted with benzene/hexane (1:1), yielding 277 mg. of a pale-yellow, crystalline solid. This material is crystallized from ethanol/water to yield 227.3 mg. of 17,17-difluoroandrost-4-en-3-one melting at 178–180.5° C., showing infrared absorption maxima at 1668 and 1622 cm.$^{-1}$. For analysis, this material is recrystallized twice from ethanol/water to yield 160 mg. melting at 181–182.8° C. The substance analyzes 73.84% C. and 8.41% H, corresponding to the calculated values for $C_{19}H_{26}OF_2$.

*Example 6.—17,17-difluoroandrosta-1,4-dien-3-one*

When treated by the process of Example 5, 2.0 g. of androsta-1,4-diene-3,17-dione is converted to 66.4 mg. of 17,17-difluoroandrosta-1,4-dien-3-one, as a first crop from ethanol/water crystallization, melting at 116–17° C. The analytical values correspond to those calculated for the empirical formula $C_{19}H_{24}F_2O$.

*Example 7.—20,20-difluoropregn-4-en-3-one*

A mixture of 2.0 g. of progesterone, 8.0 g. of sulfur tetrafluoride, 0.4 g. of boron trifluoride, and 20 ml. of ethanol-free chloroform are heated for 10 hours to 40° C. in a stainless steel pressure cylinder. After removing gases and solvents as in the previous examples, the residue is washed into a 500-ml. separatory funnel with several portions of chloroform. The total volume of the chloroform solution of about 250 ml. is washed with two 100-ml. portions of water, 100 ml. of 5% sodium bicarbonate, and two 100-ml. portions of water. The chloroform solution is dried over anhydrous magnesium sulfate and the chloroform is stripped under partial vacuum on a steam bath to leave 745 mg. of a brown tar. This material is dissolved in 50 ml. of boiling ethanol, treated with carbon, and filtered through Celite. The filtered residue is washed with 80 ml. of ethanol and the wash liquid is combined with the original ethanol filtrate The ethanol is stripped under partial vacuum leaving 460 mg. of a clear orange oil which partially crystallizes on standing. This material is chromatographed on 40 g. of alumina and eluted with benzene/hexane (1:1) to yield 50 mg. of a pale-orange, crystalline solid melting at 103.5–110° C. with infrared absorption maxima at 1672 and 1620 cm.$^{-1}$. It is recrystallized from ethanol/water to yield 36.4 mg. of 20,20-difluoropregn-4-en-3-one melting at 108.5–110° C. An analytical sample of this material shows 75.15% C, 8.95% H, and 11.55% F, corresponding to the calculated values for $C_{21}H_{30}OF_2$.

Example 8.—3,3,20,20-tetrafluoro-5-pregnan-11-one

A solution of 3 grams of 5α-pregnane-3,11,20-trione in 30 ml. of chloroform containing 3% ethanol is heated to 40° C. for 15 hours with 14 grams of sulfur tetrafluoride. After removal of the excess sulfur tetrafluoride by evaporation the product is worked up by separating it with chloroform and water. The combined chloroform solutions are chromatographed on neutral alumina of activity 111. The alumina column is then eluted with benzene/Skellysolve B (1:10) (Skellysolve B is a petroleum ether fraction boiling at 60–80° C.), yielding 545 mg. of crystalline material from which 290 mg. of pure 3,3,20,20-tetrafluoro-5α-pregnan-11-one melting at 170–1° C. is obtained after recrystallization from benzene/Skellysolve B (1:10). The new compound analyzes 66.83% C, 7.90% H, and 19.94% F, which corresponds with the calculated values for $C_{21}H_{30}OF_4$.

In a modification of this example, the above chloroform is replaced with methylene choride to which 0.3 gram of boron trifluoride is added as catalyst. Substantially the same result is obtained after the work-up described above.

By replacing the above starting material with the corresponding 5β-compound, 3,3,20,20-tetrafluoro-5β-pregnan-11-one melting at 167–8° C. is obtained.

Example 9.—3,3-difluoro-5α-pregnane-11,20-dione

Further elution of the above alumina column with benzene/Skellysolve B (1:5) yields 1.36 grams of crystalline material from which 890 mg. of pure 3,3-difluoro-5α-pregnane-11,20-dione melting at 155–6° C. is obtained after recrystallization from benzene/Skellysolve B (1:5). The analysis of this product shows 71.81% C, 8.36% H, and 10.53% F, corresponding with the calculated values for $C_{21}H_{30}O_2F_2$.

Example 10.—3,3,17,17-tetrafluoro-5α-androstan-11-one

A solution of 2.1 grams of 5α-androstane-3,11,17-trione in 20 ml. of chloroform containing 1% hydrogen fluoride is heated at 40° C. in a stainless steel pressure cylinder with 10.6 grams of sulfur tetrafluoride for 15 hours. The gaseous products are removed thereafter and the residue is washed into a 500 ml. separatory funnel with five 50-ml. portions of chloroform. The resulting chloroform solution is washed with two 100-ml. portions of water, 100 ml. of 5% sodium bicarbonate solution, and finally with two 100-ml. portions of water. The chloroform solution is then dried over anhydrous magnesium sulfate and concentrated under partial vacuum on a steam bath, leaving a dark-brown residue. This material is extracted with two portions of 200 ml. each of boiling ethanol, and the combined extracts are subsequently treated with carbon and filtered through Celite (a hydrated, amorphous, diatomaceous silica). The filter cake is washed with 100 ml. of hot ethanol and the washings are combined with the previous ethanol solution. The solution is stripped of solvent under partial vacuum on a steam bath, and the residue so obtained is chromatographed on a column of neutral alumina. Elution with benzene/hexane (1:10) yields 3,3,17,17-tetrafluoro-5α-androstan-11-one. The analytical values confirm the empirical formula $C_{19}H_{26}OF_4$.

Example 11.—17,17-difluoroandrost-4-ene-3,11-dione

A mixture of 2.2 grams of androst-4-ene-3,11,17-trione, 8.0 grams of sulfur tetrafluoride, 0.4 gram of boron trifluoride, and 20 ml. of ethanol-free chloroform is heated for 10 hours in an autoclave at 40° C. The reaction mixture is allowed to cool to room temperature and the gaseous products are stripped. The residue is washed into a 500-ml. separatory funnel with six 50-ml. portions of chloroform. The black resinous by-product is discarded. The chloroform solution is twice washed with 100-ml. portions of water, and subsequently with 100 ml. of 5% sodium bicarbonate and finally with two 100-ml. portions of water. The chloroform solution is dried over anhydrous magnesium sulfate and the chloroform is stripped under partial vacuum on a steam bath to leave a dark crystalline residue. This material is heated with 80 ml. of boiling ethanol, decolorized with carbon, and filtered through Celite. The carbon/Celite mat is washed with three 25-ml. portions of boiling ethanol and the washings are added to the original ethanol filtrate. The ethanol is stripped under partial vacuum in the steam bath leaving a brown precipitate. This material is chromatographed on 70 grams of alumina and eluted with benzene/hexane (1:1), yielding a crystalline solid upon evaporation of the solution. Recrystallization from ethanol/water produces 17,17-difluoroandrost-4-ene-3,11-dione. The analysis corresponds to the calculated values for $C_{19}H_{24}O_2F_2$.

Example 12.—17,17-difluoro-5-androstane-3,11-dione

Upon hydrogenation of 17,17-difluoroandrost-4-ene-3,11-dione of Example 11 in the presence of palladium catalyst according to the method described by Steiger and Reichstein in Helv. Chem. Acta, volume 20, pp. 822 ff. (1937), a good yield of 17,17-difluoro-5α-androstane-3,11-dione is obtained.

Example 13.—17β-acetoxy-3,3-difluoro-5β-androstan-11-one

From the reaction of 17β-acetoxy-5β-androstane-3,11-dione with sulfur tetrafluoride under the conditions described in Example 8, followed by elution of the alumina column with benzene/Skellysolve B (1:1) and evaporation of the eluate, 17β-acetoxy-3,3-difluoro-5β-androstan-11-one is obtained. The analytical values obtained are in agreement with the compound of the empirical formula $C_{21}H_{30}F_2O_3$.

Example 14.—3α-acetoxy-20,20-difluoro-5β-pregnan-11-one

By substituting 3α-acetoxy-5β-pregnan-11,20-dione for the androst-4-ene-3,11,17-trione in Example 11, 3α-acetoxy-20,20-difluoro-5β-pregnan-11-one of the formula $C_{23}H_{34}F_2O_3$ is obtained.

Example 15.—3,3,17,17-tetrafluoro-5α-androstan-12-one

In a repetition of Example 10 but using 5α-androstane-3,12,17-trione (described by Adams et al. in J. Chem. Soc. 1954, 2298) as the starting material and otherwise proceeding as described, 3,3,17,17-tetrafluoro-5α-androstan-12-one is obtained, which can be worked up to an analytically pure sample as described in Example 10.

The corresponding 5β-isomer is made by the same process but using the corresponding 5β-compound (see Reichstein, Helv. 28, 863, of 1945) as the starting material.

Example 16.—3,3-difluoro-5α-androstane-12,17-dione

By further eluting the alumina column used in the chromatogram of Example 15 with benzene, 3,3-difluoro-5α-androstane-12,17-dione is obtained as white crystals. The analytical values correspond with those calculated for the empirical formula $C_{19}H_{26}O_2F_2$.

Example 17.—3,3,20,20-tetrafluoro-5β-pregnan-12-one

By following the procedure shown in Example 8 but using 5β-pregnane-3,12,20-trione as the starting material (described by Wagner et al., J.A.C.S. 71, 3856, of 1949), 3,3,20,20-tetrafluoro-5β-pregnan-12-one is obtained in pure form by recrystallization of the crude material obtained according to Example 8.

The corresponding 5α-isomer is obtained in the same fashion by using 5α-pregnane-3,12,20-trione (described by Wagner et al. ibid).

Example 18.—3,3-difluoro-5β-pregnane-12,20-dione

By further elution of the alumina column of the previous example with benzene/Skellysolve B (1:1), a crystalline solid is obtained which can be crystallized from the same solvent mixture to produce an analytical sample of 3,3-difluoro-5β-pregnane-12,20-dione of which the analytical values correspond with those calculated for the compound of empirical formula $C_{21}H_{30}O_2F_2$.

In the above, mention is made of using at least one molar equivalent of sulfur tetrafluoride, and that the hydrogen fluoride catalyst can be prepared in situ from said fluoride. When the hydrogen fluoride is intended to be generated in that way, obviously the necessary amount of sulfur tetrafluoride must be determined by the molar amount needed for the reaction and the amount needed to generate the catalytic amount of hydrogen fluoride. It is for this reason that the sulfur tetrafluoride is usually added in amounts of 2–30 molar equivalents to the steroid starting material. The excess sulfur tetrafluoride may at all times be larger, since this material, under the reaction conditions described, also serves as a solvent.

Others may practice the invention in any of the numerous ways which will be apparent to one skilled in the art from the present disclosure. All such practice of the invention is considered a part hereof provided it falls within the scope of the appended claims.

We claim:

1. The process of converting reactive oxo-groups in steroids into gem-difluoro groups of the androstane and pregnane series comprising the step of treating a steroid of said series containing at least one reactive oxo-group in an inert solvent with at least one molar equivalent of sulfur tetrafluoride in the presence of a catalytic amount of a compound selected from the group consisting of hydrogen fluoride and boron trifluoride.

2. The process of converting reactive oxo-groups in steroids into gem-difluoro groups of the androstane and pregnane series consisting essentially of the step of reacting a steroid starting material of the formula

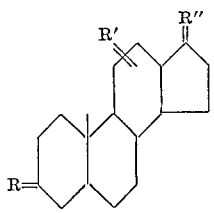

wherein
R' is selected from the group consisting of

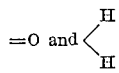

R'' is selected from the group consisting of

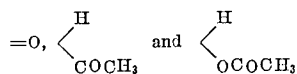

and wherein the A/B-rings have a partial structure selected from the group consisting of

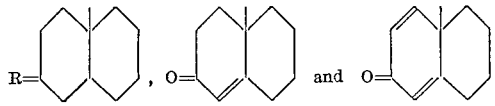

with R being selected from the group consisting of

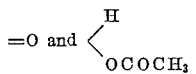

said steroid starting material carrying at least one reactive oxo-group, with at least one molar equivalent of sulfur tetrafluoride in an inert solvent and in the presence of a catalytic amount of a compound selected from the group consisting of hydrogen fluoride and boron trifluoride.

3. The process of claim 2 when carried out in the presence of hydrogen fluoride.

4. The process of claim 3 wherein said hydrogen fluoride is formed in situ from the sulfur tetrafluoride present by the addition of a catalytic amount of a hydroxy compound selected from the group consisting of water and lower alkyl hydroxides.

5. The process of claim 2 wherein a reaction temperature between 5° and 25° C. is maintained for several hours.

6. The process of claim 2 wherein said sulfur tetrafluoride is used in a molar proportion of 1:1 to 30:1 in respect to said steroid starting material.

7. The process of claim 2 wherein said non-aqueous solvent is chloroform.

8. The process of claim 2 wherein said reaction is carried out in chloroform and said hydrogen fluoride is formed in situ by adding 1–5% by volume of a compound of the formula ROH wherein R is selected from the group consisting of hydrogen, lower alkyl and phenyl.

9. The process of claim 8 wherein said compound of formula ROH is ethanol.

No references cited.

LEWIS GOTTS, *Primary Examiner.*

E. L. ROBERTS, *Assistant Examiner.*